United States Patent [19]

Kobashi et al.

[11] Patent Number: 4,533,538

[45] Date of Patent: Aug. 6, 1985

[54] METHOD OF PRODUCING COLLOIDAL ANTIMONY OXIDE

[75] Inventors: Toshiyuki Kobashi; Hideo Naka, both of Okayama, Japan

[73] Assignee: Japan Exlan Company Limited, Osaka, Japan

[21] Appl. No.: 620,046

[22] Filed: Jun. 12, 1984

[30] Foreign Application Priority Data

Jun. 16, 1983 [JP] Japan ............................. 58-108940
Dec. 21, 1983 [JP] Japan ............................. 58-242906

[51] Int. Cl.$^3$ ............................................. C01B 29/00
[52] U.S. Cl. ..................................................... 423/617
[58] Field of Search ......................................... 423/617

[56] References Cited

U.S. PATENT DOCUMENTS 3,960,989  6/1976  Petrow et al. ............... 260/45.75 B Primary Examiner—John Doll
Assistant Examiner—Wayne A. Langel
Attorney, Agent, or Firm—Wenderoth, Lind & Ponack

[57] ABSTRACT

Colloidal antimony oxide is produced by reacting hydrogen peroxide with antimony trioxide to form a colloidal salt of antimony oxide. In the reaction there is added to the reaction system 1.5 to 30 mol percent of an inorganic alkaline substance per mol of antimony trioxide.

6 Claims, No Drawings

METHOD OF PRODUCING COLLOIDAL ANTIMONY OXIDE

This invention relates to a method of industrially advantageously producing stable colloidal antimony oxide with a fine particle diameter and high concentration.

Antimony oxide has been conventionally used together with an organic chloride, bromide and halogen-containing substance in order to impart flame retardancy to textile fabrics, fibers, plastics, etc. However, such conventional antimony oxide is of such particle diameter as of a pigment and has therefore caused various trouble such as reducing the hand, transparency and other physical properties of the resulting product.

Therefore, in order to overcome such troubles, methods of obtaining antimony oxide of a fine particle size have been proposed. As a typical example thereof, there has been proposed a method of forming a colloidal sol of $Sb_2O_5$ having a particle diameter of 2 to 100 m$\mu$ by causing $Sb_2O_3$ to react with KOH and $H_2O_2$ at a molar ratio approximately of 1:2.1:2 to form potassium antimonate and then deionizing the same (Japanese Patent Publication No. 11848/82). However, in this method, a large amount of KOH is used so that impurities will remain in the product and there is essentially required a deionizing step to remove the impurities. Further, the concentration of $Sb_2O_5$ obtained by this method is low (if the concentration is high, the particle diameter will become large) so that an evaporating step is required to obtain a product of a concentration high enough to have a commercial value.

On the other hand, as shown, for example, in Japanese Patent Kokai No. 123997/77, there has been proposed a method in which no alkaline substance is added. While there is no problem of removing impurities, the reaction speed is so low that a high temperature condition close to the boiling state is used. As a result thereof, such danger as bumping will occur and, once the reaction starts, heat will be quickly generated due to the reaction heat so that the temperature will be difficult to control and the scale up of the reaction system will be greatly restricted and the costs of the equipment and energy can not avoid becoming high.

The antimony oxide thus produced is used for the above described various applications and is, in many cases, mixed with various latexes. When it is mixed with such latex, the colloid will cohere or aggregate due to inorganic salts and others present in the latex. Thus there has been a problem that the chemical stability is poor.

As a result of research work for a method of industrially producing colloidal antimony oxide having a commercial value by overcoming the above mentioned drawbacks, Applicants have found the fact that, by adding an inorganic alkaline substance within a specific range to the reaction system, all the drawbacks encountered in the conventional methods are overcome and colloidal antimony oxide of a fine particle diameter and high concentration can be industrially advantageously produced. Applicants have also found that, while the amount of hydrogen peroxide used per mole of antimony trioxide has conventionally been more than 2 mols, i.e., more than the stoichiometrical amount required to oxidize antimony trioxide to antimony pentoxide, by using hydrogen peroxide in an amount far smaller than such stoichiometrical amount and adding an inorganic alkaline substance to the reaction system, all the drawbacks accompanied in the conventional methods can be eliminated and colloidal antimony oxide particularly high in chemical stability can be industrially advantageously produced.

Thus, a principal object of the present invention is to provide a method of industrially advantageously producing a colloidal sol of antimony oxide of a fine particle diameter and high concentration and with a low impurity content.

Another object of the present invention is to provide a method of producing colloidal antimony oxide which method is economically and industrially excellent in saving energy, in simplicity of the steps and in the ease of the reaction operation.

Another object of the present invention is provide a method of industrially producing a colloidal sol of antimony oxide of a fine particle diameter and high concentration, low impurity content and high chemical and mechanical stability.

These objects are attained according to this invention by making hydrogen peroxide react with antimony trioxide to form a colloidal sol of antimony oxide, characterized by adding to the reaction system an inorganic alkaline substance in an amount of 1.5–30 mol % based on antimony trioxide and preferably by making the mol ratio of antimony trioxide to hydrogen peroxide 1:1.25–1.8.

As the inorganic alkaline substances to be used in the present invention, there may be enumerated hydroxides of alkali metals such as lithium, potassium and sodium or alkaline earth metals such as magnesium, calcium and barium; ammonia; inorganic salts such as sodium carbonate, ammonium carbonate and sodium phosphate. Particularly preferable are alkali metal hydroxides such as LiOH, KOH and NaOH, since when they used the reaction speed will be further accelerated and colloidal antimony of a fine particle diameter will be efficiently obtained. The above mentioned substances may well be used together.

The amount of the above mentioned alkaline substance should be within the range of 1.5–30 mol % or preferably 2–20 mol % based on antimony trioxide. In case the amount deviates from such range, the reaction accelerating effect will be insufficient so that not only the reaction of hydrogen peroxide with antimony trioxide will have to be maintained at a temperature near or above the boiling point of water, but also the particle diameter of the resulting antimony oxide in the high concentration reaction system will become very large.

In case a larger amount of the alkaline substance must be added to adjust the pH of the product, it will be possible to add such additionally required amount at the end of the reaction.

The particle diameter of antimony trioxide to be used in the present invention may be generally below 100$\mu$, but is preferably below 10$\mu$ from the viewpoint of the dispersibility in water and the reactivity with hydrogen peroxide.

Such antimony trioxide is dispersed in water to form a dispersion for the reaction. The concentration of antimony trioxide in the dispersion is generally 5–40% by weight and preferably 7–25% by weight. The amount of hydrogen peroxide in the case of producing colloidal antimony oxide particularly high in the chemical stability must be in a range of 1.25–1.8 mols, preferably 1.3–1.8 mols per mol of antimony trioxide. In case the amount is less than 1.25 mols, no colloidal fine particles will be obtained and, in case it exceeds 1.8 mols, such drawbacks as the reduction of the chemical stability against an electrolyte such as an inorganic salt will be caused and the problem of unreacted hydrogen peroxide remaining in the obtained product will occur.

The above mentioned inorganic alkaline substance is to added to the thus obtained dispersion consisting of antimony trioxide, hydrogen peroxide and water. As to the order of adding the alkaline substance, for example, it may be added in advance to the antimony trioxide dispersion and is heated to react or hydrogen peroxide may be added after antimony trioxide is dispersed with water and the inorganic alkaline substance.

The reaction temperature for industrial practice is kept at 50°–100° C. or preferably at 70°–100° C. As the reaction can be started even at such low temperature as, for example, below 60° C., not only the energy required to heat the reaction system may be very little but also the heat generated by the reaction will be almost absorbed to heat the reaction system to the boiling point, the cooling from the outside will be little required and there is almost no problem of controlling the temperature to prevent bumping.

The dispersion after the reaction under the above mentioned conditions is in the form of a colloidal sol of antimony oxide of a solid concentration of about 6–45% by weight or preferably 8–28% by weight depending upon the concentration of antimony trioxide used in the starting dispersion. If desired the colloidal sol may be concentrated to obtain a colloidal sol of a solid concentration of more than 45% without requiring the addition of any stabilizer.

Further, it should be noted that, even when such colloidal sol is left standing for a long period of time, the colloid will be not broken and the colloid will be very stable for a long period of time.

It is not clear why, as described above, in the case of making antimony trioxide and hydrogen peroxide react with each other by adding a specific amount of an inorganic alkaline substance, a colloidal sol of antimony oxide of a very fine particle diameter will be obtained or, by using hydrogen peroxide less than the stoichiometrical value, a particularly chemically stable colloidal sol of antimony oxide will be obtained. However, it is presumed that, in the reaction of antimony trioxide and hydrogen peroxide with each other, the inorganic alkaline substance will perform a catalytic action to accelerate the reaction, the specific amount of alkali present in the reaction system will perform some role to fine the produced antimony oxide particles and the produced antimony oxide will be somewhat different from so far considered antimony pentoxide.

It is the remarkable effect of the present invention that, according to such method of the present invention, by adding a proper amount of an inorganic alkaline substance, the reaction of antimony trioxide and hydrogen peroxide with each other in an aqueous medium will proceed so easily that a colloidal sol of antimony oxide of a very fine particle diameter and having a very low impurity content can be produced at a high concentration at a temperature below the boiling point in a simple production step and, by controlling the amount of hydrogen peroxide, a colloidal sol of antimony oxide particularly high in the chemical stability and leaving no unreacted hydrogen peroxide in the resulting colloidal sol can be produced.

Further, in the present invention, as a colloidal antimony oxide of a high concentration is obtained, the evaporating operation for concentration is not necessary or may be slight even if necessary and, as the reaction can be made at a low temperature, the energy consumption may be little and the economic effects are large. Further, there are such advantages that, as the reaction is possible at a low temperature, there is no problem in safety such as bumping and the reaction temperature is easy to control.

There are further advantages that the colloidal antimony oxide obtained according to the present invention is very small in particle diameter and therefore the surface area is large so that it is very efficient to impart flame retardancy and the amount of antimony required to obtain the desired flame retardancy may be much smaller than that required with the existing product.

By the method of the present invetion, the drawbacks of the conventional methods such as the complicacy of the steps, high production cost due to the use of expensive auxiliary raw materials, nonuniformity of the quality and difficulty to remove impurities from the products have been all overcome and the quality of the product is far superior to that of the conventional colloidal sol.

The colloidal sol of antimony oxide obtained according to the present invention may be used as such or as further concentrated as required for such uses as of a flame retardant and the like. Antimony oxide particles separated by spray-drying can be also used for the above described purposes.

The present invention will be more concretely explained by referring to the following examples, which, however, are to better explain the present invention and are not to limit the scope of the invention. The percentages shown in the examples and controls are all by weight unless otherwise specified.

Further, in the examples and controls, the light transmission of white light through a colloidal sol of a concentration of 0.4% solid was measured by using a HITACHI-101 Spectrophotometer (made by Hitachi, Ltd.). The larger the value, the smaller the colloid particles.

EXAMPLE 1

By using a three-necked reactor (capacity of 1 liter) provided with a stirrer and immersed in a 90° C. thermostatic water vessel, a colloidal sol of antimony oxide was synthesized.

For the reaction, predetermined amounts of water, antimony trioxide and NaOH were first charged into the reactor and the mixtured was stirred to form a slurry. When the temperature of the content reached 80° C., 2.5 mols of an aqueous solution of $H_2O_2$ (concentration of 35%) per mol of antimony trioxide were added to the slurry to react for one hour. The reaction conditions and the characteristics of the products are shown in the following Table 1.

TABLE 1

| Experiment No. | 1 | 2 | 3 | 4 | 5 | 6 | 7 | 8 | 9 | 10 |
|---|---|---|---|---|---|---|---|---|---|---|
| $Sb_2O_3$ % (on total amount) | 14 | 14 | 14 | 14 | 14 | 14 | 14 | 14 | 14 | 14 |
| NaOH mol % (on $Sb_2O_3$) | 0 | 0.8 | 1.5 | 3 | 5 | 10 | 20 | 30 | 40 | 50 |
| Light transmission T % | 15 | 35 | 70 | 82 | 92 | 91 | 88 | 72 | 50 | 35 |

It will be noted from the above that colloidal sols of antimony oxide having fine particle diameter are obtained from Experiments Nos. 3 to 8 according to the present invention.

When the reaction was conducted according to the above process except that, instead of NaOH, 5 and 10 mols of ethanolamine per mol of antimony trioxide were respectively added and the reaction temperature was 100°–110° C., the light transmissions of the products were respectively 17 and 20%.

EXAMPLE 2

The same procedure as in Example 1 (Experiment No. 5) was repeated except that the concentration of the antimony trioxide was varied, to obtain the products 11–16.

The characteristics of the products are shown in Table 2. For controls the reactions were made in the same manner as is mentioned above (at a reaction temperature of 100° C.) except that 200 mol % of NaOH per mol of antimony trioxide were added and that no NaOH was added. The results are also shown in Table 2.

TABLE 2

| Experiment No. | | 11 | 12 | 13 | 14 | 15 | 16 | |
|---|---|---|---|---|---|---|---|---|
| $Sb_2O_3$ % (on total amount) | | 5 | 7 | 10 | 15 | 20 | 25 | |
| Light trans- mission T in % | NaOH: 5 mol % | 93 | 93 | 93 | 90 | 82 | 71 | Present invention |
| | NaOH: 200 mol % | 93 | 92 | 61 | 28 | 14 | 8 | Controls |
| | NaOH: 0 | 78 | 68 | 40 | 9 | 3 | — | |

EXAMPLE 3

By using a three-necked flask reactor (capacity of 1 liter) provided with a stirrer and immersed in a 90° C. thermostatic water vessel, a colloidal sol of antimony oxide was synthesized.

For the reaction, predetermined amounts of water, antimony trioxide and NaOH were first charged into the reactor and the mixture was stirred to form slurry. When the temperature of the content reached 50° C., an aqueous solution of $H_2O_2$ (of a concentration of 35%) was added to react for one hour.

The reaction conditions and the characteristics of the products are shown in Table 3.

TABLE 3

| Experiment No. | 17 | 18 | 19 | 20 | 21 | 22 | 23 | 24 | 25 | 26 |
|---|---|---|---|---|---|---|---|---|---|---|
| $Sb_2O_3$ % by weight (on total weight) | 13 | 13 | 13 | 13 | 13 | 13 | 13 | 13 | 13 | 13 |
| $H_2O_2$ mols (per mol of $Sb_2O_3$) | 1.2 | 1.25 | 1.3 | 1.5 | 1.7 | 1.9 | 2.1 | 1.5 | 1.5 | 1.5 |
| NaOH mol % (per mol of $Sb_2O_3$) | 10 | 10 | 10 | 10 | 10 | 10 | 10 | 15 | 0 | 50 |
| Light trans- mission T in % | 29 | 82 | 92 | 93 | 92 | 91 | 92 | 68 | Less than 10 | Less than 10 |

It will be noted from the above that colloidal sols of antimony oxide having a fine particle diameter are obtained from Experiments Nos. 18 to 24.

On the other hand, in order to investigate the stability against the inorganic salt electrolyte, the dilution of the sample to a concentration of 0.4% for measurement of the light transmission was made with an aqueous solution of 0.5% sodium thiocyanate instead of water. The results were as follows:

| Experiment No. | 17 | 18 | 19 | 20 | 21 | 22 | 23 | 24 | 25 | 26 |
|---|---|---|---|---|---|---|---|---|---|---|
| Light trans- mission T in % | 25 | 78 | 88 | 75 | 68 | 35 | 37 | 65 | Less than 10 | Less than 10 |

As apparent from the above, in Experiments Nos. 18 to 21 and 24 according to the present invention, the reduction of the light transmission is small, no substantial aggregation is caused even in the aqueous solution of sodium thiocyanate and the product is chemically very stable.

For comparison, when the reactions were conducted according to the above process except that 5 and 10 mols of triethanolamine per mol of antimony trioxide were added instead of NaOH and the reaction temperature was 100°–110° C., the light transmissions of the products were respectively 17 and 20%.

What is claimed is:

1. A method of producing colloidal antimony oxide by making hydrogen peroxide react with antimony trioxide to form a colloidal sol of antimony oxide, characterized by adding to the reaction system 1.5–30 mol percent of an inorganic alkaline substance based on antimony trioxide.

2. A method according to claim 1 wherein said inorganic alkaline substance is an alkali metal hydroxide.

3. A method according to claim 1 wherein the reaction is conducted at a temperature of 50°–100° C.

4. A method of producing colloidal antimony oxide by making hydrogen peroxide react with antimony trioxide to form a colloidal sol of antimony oxide, characterized by making the mol ratio of antimony trioxide to hydrogen peroxide 1:1.25–1.8 and adding to the reaction system 1.5–30 mol percent of an inorganic alkaline substance based on antimony trioxide.

5. A method according to claim 4 wherein said inorganic alkaline substance is an alkali metal hydroxide.

6. A method according to claim 4 wherein the reaction is conducted at a temperature of 50°–100° C.

* * * * *